United States Patent
Nainar et al.

(10) Patent No.: US 10,887,209 B2
(45) Date of Patent: Jan. 5, 2021

(54) IN-SITU OAM FOR MULTICAST PATH, TELEMETRY DATA COLLECTION AND RECEIVE-ONLY SERVICE FUNCTION PROOF OF TRANSIT

(71) Applicant: Cisco Technology, Inc., San Jose, CA (US)

(72) Inventors: Nagendra Kumar Nainar, Morrisville, NC (US); Carlos M. Pignataro, Cary, NC (US); Frank Brockners, Cologne (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 15/996,796

(22) Filed: Jun. 4, 2018

(65) Prior Publication Data

US 2019/0372877 A1 Dec. 5, 2019

(51) Int. Cl.
*H04L 12/26* (2006.01)
*H04L 12/761* (2013.01)
*H04L 12/753* (2013.01)
*H04L 29/06* (2006.01)

(52) U.S. Cl.
CPC ............ *H04L 43/10* (2013.01); *H04L 45/16* (2013.01); *H04L 45/48* (2013.01); *H04L 69/22* (2013.01)

(58) Field of Classification Search
CPC ......... H04L 43/40; H04L 45/16; H04L 45/48; H04L 69/22
See application file for complete search history.

(56) References Cited

U.S. PATENT DOCUMENTS

| | | | |
|---|---|---|---|
| 2006/0133286 A1* | 6/2006 | Elie-Dit-Cosaque | H04L 45/00 370/249 |
| 2006/0143300 A1* | 6/2006 | See | H04L 43/026 709/227 |
| 2012/0170575 A1* | 7/2012 | Mehra | H04L 45/7453 370/359 |
| 2012/0236734 A1* | 9/2012 | Sampath | H04L 12/4641 370/252 |
| 2014/0133305 A1* | 5/2014 | Brolin | H04L 43/026 370/235 |

(Continued)

OTHER PUBLICATIONS

E. Wang, et al., "Receive-Only Service Function and External Service in SFC", draft-wang-sfc-receive-only-01, Service Function Chaining, Cisco Systems, Inc., IETF Trust, Oct. 25, 2016, 17 pgs.

(Continued)

*Primary Examiner* — Jael M Ulysse
(74) *Attorney, Agent, or Firm* — Edell, Shapiro & Finnan, LLC

(57) ABSTRACT

A method is provided that is performed by a network element in a network. The network element receives a packet. The network element inserts into a header of the packet, packet replication information indicating whether and to which egress interface the network element performs a replication operation on the packet, wherein the header is an In-Situ Operations, Administration and Management (IOAM) header. The network element sends the packet, with the packet replication information included in the IOAM header, in the network.

20 Claims, 8 Drawing Sheets

(56) References Cited

U.S. PATENT DOCUMENTS

| | | | |
|---|---|---|---|
| 2015/0043330 A1* | 2/2015 | Hu | H04L 45/68 370/390 |
| 2015/0124622 A1* | 5/2015 | Kovvali | H04L 67/1006 370/236 |
| 2015/0131660 A1* | 5/2015 | Shepherd | H04L 45/74 370/390 |
| 2015/0180788 A1* | 6/2015 | Kompella | H04L 45/22 370/236.2 |
| 2015/0256456 A1* | 9/2015 | Previdi | H04L 69/22 370/392 |
| 2016/0028640 A1* | 1/2016 | Zhang | H04L 69/22 370/389 |
| 2016/0127142 A1* | 5/2016 | Tian | H04L 12/1886 370/390 |
| 2016/0254987 A1* | 9/2016 | Eckert | H04L 12/4633 370/390 |
| 2016/0308696 A1* | 10/2016 | Nishimura | H04L 45/38 |
| 2016/0315850 A1* | 10/2016 | Dara | H04L 9/32 |
| 2017/0111209 A1* | 4/2017 | Ward | H04L 41/0631 |
| 2017/0279712 A1 | 9/2017 | Nainar et al. | |
| 2018/0331890 A1* | 11/2018 | Song | H04L 41/08 |
| 2018/0331933 A1* | 11/2018 | Song | H04L 29/0653 |

OTHER PUBLICATIONS

F. Brockners, et al., "Data Fields for In-situ OAM", draft-ieft-ippm-ioam-data-01, ippm, IETF, Oct. 30, 2017, 29 pgs.

R. Aggarwal, et al., "BGP Encodings and Procedures for Multicast in MPLS/BGP IP VPNs", Internet Engineering Task Force (IETF), RFC 6514, ISSN: 2070-1721, Feb. 2012, 59 pgs.

Cisco, Systems, Inc., "Rendezvous Point Engineering", White Paper, Aug. 2009, 6 pgs.

Cisco, Systems, Inc., "Multicast VPN Design Guide", https://www.cisco.com/en/US/tech/tk828/tech_digest09186a00801a64a3 . . . , Downloaded from the Internet on Jan. 18, 2018, 24 pgs.

Frank Brockners: "Next-gen Network Telemetry is Within Your Packets: In-band OAM", Jun. 28, 2017, 51 pages, XP055604135, Retrieved from the Internet: URL: https://www.cisco.com/c/dam/m/en_us/network-intelligence/service-provider/digital-transformation/knowledge-network-webinars/pdfs/0628-techad-ckn.pdf.

Asaeda, H. et al: "Mtrace Version 2: Traceroute Facility for IP Multicast", Draft-IETF-MBONED-MTRACE-V2-23.TXT: IETF Draft: No. 23, Apr. 3, 2018, XP015125817, pp. 1-38.

International Search Report and Written Opinion in counterpart International Application No. PCT/US2019/034363, dated Jul. 24, 2019, 17 pages.

* cited by examiner

US 10,887,209 B2

IN-SITU OAM FOR MULTICAST PATH, TELEMETRY DATA COLLECTION AND RECEIVE-ONLY SERVICE FUNCTION PROOF OF TRANSIT

TECHNICAL FIELD

The present disclosure relates to network inband telemetry data collection.

BACKGROUND

In-Situ Operations Administrator and Management (IOAM) is an inband telemetry data collection technique. In-Situ OAM allows a network/service operator to collect real-time telemetry data by embedding the data inband within actual data traffic. Such collected inband telemetry data allows a network/service operator to instantly react to any network events. The telemetry data collected by In-Situ OAM can be done on different layers. For example, a Hop-by-Hop option collects the path and/or performance data from each network element at the network layer. Alternately, In-Situ OAM header can be included in a service header (like Segment Routing (SR), Network Service Header (NSH), and Generic Routing Encapsulation (GRE)) to collect the data from service nodes.

DESCRIPTION OF EXAMPLE EMBODIMENTS

Overview

In accordance with one embodiment, a method is provided that is performed by a network element in a network. The network element receives a packet. The network element inserts into a header of the packet, packet replication information indicating whether the network element performs a replication operation on the packet, wherein the header is an In-Situ Operations, Administration and Management (IOAM) header. The network element sends the packet, with the packet replication information included in the IOAM header, in the network.

Example Embodiments

Efforts in the industry around the use of In-Situ OAM are primarily for unicast data path. However, there are benefits in applying the In-Situ OAM techniques in the multicast data path and unicast paths that involve packet replication as well. For example, In-Situ OAM telemetry data collection can be useful for collecting complete path information from a headend to each leaf node, and for performance measurements from headend to leaf node(s). Presented herein are techniques to extend the applicability of In-Situ OAM for multicast data paths or other unicast data paths that involve a packet replication operation. For example, as described below in connection with FIG. 6, packet replication information may be included in unicast traffic, where the packet replication information indicates a packet has been replicated to be processed by a receive-only service function in a service function chain.

For unicast traffic, a packet comes in on one interface of a network device and goes out on another interface. However, for multicast traffic, a packet comes in on one interface of a network device but it is replicated and goes out on multiple interfaces of the network device, if that network device is a replicator. It is desirable to be able to identify the exact set of nodes that the particular multicast node travels, with additional details about the underlay network and overlay network. Any replicating node will replicate the IOAM data, include itself as a replicator and add additional path information. Capturing the data at any leaf node can be helpful to understand the exact path and the replication nodes along the path.

Figure 1:
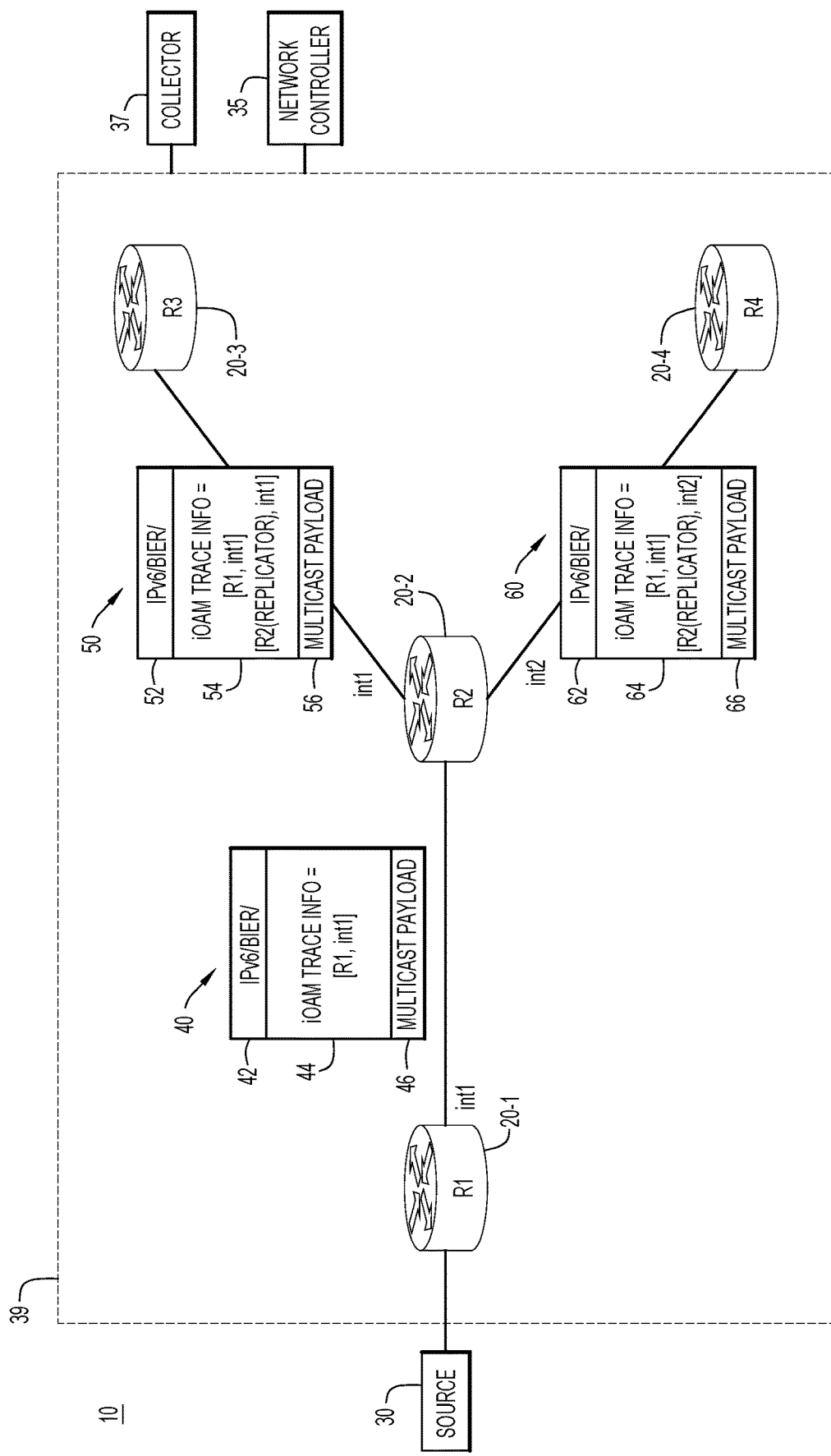
FIG. 1 is diagram of a network in which a network element is configured to insert packet replication information into an IOAM header, according to an example embodiment.

Reference is now made to FIG. 1. FIG. 1 shows a simplified network 10 that includes four nodes (routers): R1, R2, R3 and R4, indicated by reference numerals 20-1, 20-2, 20-3 and 20-4, respectively. In the diagram, R1 is an upstream node that receives the traffic from a source 30 and R2 is the branching point node. R2 is a replicator that replicates the multicast payload to R3 and R4. When a node replicates a packet to multiple egress interfaces, such as is the case for R2 in the example of FIG. 1, that node is considered a branching point. According to the techniques presented herein, additional information is included in the IOAM header of packets to indicate that when a node replicates and forwards traffic over certain interfaces.

FIG. 1 also shows a network controller (management entity) 35 and at least one collector 37. The nodes 20-1-20-4 of network 10 may be part of a particular IOAM domain shown at reference numeral 39, and there may be other IOAM domains (not shown), which are under control of the network controller 35 or under control of a separate/different network controller. For simplicity, only a single network controller 35 is shown in FIG. 1. There may be a dedicated collector entity for each of the other IOAM domains.

The collector 37 may be a network analysis entity or application that can store and analyze received IOAM data, or make the stored IOAM data available to another entity, such as the network controller 35, for analysis. In some embodiments, the functions of the collector 37 may be integrated with the functions of the network controller 35.

The part of the network which employs IOAM is referred to as the "IOAM domain". IOAM data is added to a packet upon entering the IOAM domain and is removed from the packet when exiting the domain. Within the IOAM domain, the IOAM data may be updated by network nodes that the packet traverses. The device which adds an IOAM data container to the packet to capture IOAM data is called the "IOAM encapsulating node", whereas the device which removes the IOAM data container is referred to as the "IOAM decapsulating node". Nodes within the domain which are aware of IOAM data and read and/or write or process the IOAM data are called "IOAM transit nodes". IOAM nodes which add or remove the IOAM data container can also update the IOAM data fields at the same time. Or in other words, IOAM encapsulating or decapsulating nodes can also serve as IOAM transit nodes at the same time. As an example, nodes R3 and R4 may be decapsulate IOAM data and forward it to the collector 37. The network controller 35 may analyze the IOAM data obtained for the IOAM domain 39 and depending on what is observed in the IOAM domain 39, the network controller 35 may generate and forward controls/commands to one or more network elements in the IOAM domain 39 to change/modify a configuration of one or network elements to improve the performance of the network. Such changes may include changing network topology, Quality of Service (QoS) processing, multicast distribution tree configuration, etc.

IOAM tracing data, which includes the packet replication related information described above, is collected at every node that a packet traverses to ensure visibility into the entire path a packet takes within an IOAM domain, i.e., in a typical deployment all nodes in an IOAM would participate in IOAM and thus be IOAM transit nodes, IOAM encapsulating or IOAM decapsulating nodes. If not all nodes within a domain are IOAM capable, IOAM tracing information will only be collected on those nodes which are IOAM capable. Nodes which are not IOAM capable will forward the packet without any changes to the IOAM data fields.

In conventional IP multicast forwarding, the packets of a given multicast "flow" are forwarded along a tree that has been constructed for the specific purpose of carrying that flow. This requires transit nodes to maintain state on a per-flow basis, and requires the transit nodes to participate in multicast-specific tree building protocols. The flow to which a packet belongs is determined by its IP source and destination address fields.

BIER (Bit Index Explicit Replication) is an alternative method of multicast forwarding. It does not require any multicast-specific trees, and therefore does not require any multicast-specific tree building protocols. Within a given "BIER domain", an ingress node encapsulates a multicast data packet in a "BIER header". The BIER header identifies the packet's egress nodes in that domain. Each possible egress node is represented by a single bit within a bit string. To send a packet to a particular set of egress nodes, the ingress node sets the bits for each of those egress nodes, and clears the other bits in the bit string. Each packet can then be forwarded along the unicast shortest path tree from the ingress node to the egress nodes. Thus, there are no per-flow forwarding entries.

Still referring to FIG. 1, R1 receives traffic from the source 30 and forwards it to R2. FIG. 1 shows a packet 40 that R1 sends to R2. Packet 40 includes a transport header 42, such as an IPv6 header. Packet 40 further includes an IOAM header 44 and the payload 46, which is a multicast payload. R1 will insert into an IOAM header 44 of packet 40 IOAM trace information indicating that it sends out the packet on the egress interface between R1 and R2 (denoted "int1) in the IOAM header 44. Thus, R1 includes in the IOAM header 44 IOAM trace information "[R1, int1]", as shown in FIG. 1.

R2 sends one copy of the multicast payload of packet 40 in packet 50 to R3 and sends another copy of multicast payload of packet 40 in packet 60 to R4. Specifically, when R2 receives the packet 40 from upstream node R1, R2 replicates the packet so that it can send (the multicast content of) packet 40 to both R3 and R4. Packet 50 includes a transport header 52, an IOAM header 54 and multicast payload 56. R2 includes in the IOAM header 54 information that it received the packet on the ingress interface between R1 and R2 (denoted "int1"), an indication in the IOAM header 54 that R2 is a multicast Replicator (denoted "R2 (replicator)" as an example) and information indicating that it sends the packet out on the egress interface between R2 and R3 (denoted int1"). Thus, R2 includes in the IOAM header 54 IOAM trace information "[R1, int1]" and "[R2 (replicator), int1]". R2 sends packet 50 to R3.

Packet 60 includes a transport header 62, IOAM header 64 and multicast payload 66. Similarly, R2 will include in the IOAM header 64 information indicating that it received the packet on the ingress interface between R1 and R2 (denoted "int1"), an indication in the IOAM header 64 that R2 is a multicast Replicator (denoted "R2(replicator)") and includes information that it sends the packet out on the egress interface between R2 and R4 (denoted "int2"). Thus, R2 includes in the IOAM header 64 IOAM trace information "[R1, int1]" and "[R2(replicator), int2]". R2 sends packet 60 to R4.

As one variation to the concepts described above in connection with FIG. 1, information may be included in the IOAM header as to which other (additional) egress interface(s) that data/packet was replicated. For example, the IOAM header 54 of packet 50 may further include "[R2 (replicator), int2]" to indicate in packet 50 (to all entities that receive packet 50) that R2 also replicated that data/packet to egress interface int2 of R2. Similarly, the IOAM header 64 of packet 60 may further include "[R2(replicator), int1]" to indicate in packet 60 (to all entities that receive packet 60) that R2 also replicated that data/packet to egress interface int1 of R2.

Any node that is a replicating node will replicate the IOAM header, include information indicating that it is a replicator, and add additional path information as indicated in the example of FIG. 1.

A node may include additional details as to whether it forwarded the traffic over a shared tree or a source tree. The simplest form of a multicast distribution tree is a source tree with its root at the source and branches forming a spanning tree through the network to the receivers. This type of tree uses the shortest path through the network, and therefore it is also referred to as a shortest path tree (SPT). In a shared tree, the root of the distribution tree is a router, not a host, and the source is located somewhere in the core of the network. In the primary sparse mode multicast routing protocol, called the Protocol Independent Multicast Sparse Mode (PIM SM), the core router at the root of the shared tree is the rendezvous point (RP).

Thus, additional details relevant to various aspects of a multicast flow may be included in the IOAM header of a packet. For example, if a node is a Rendezvous Point (RP) for a multicast shared tree group, that node can set the role details as "RP" in the IOAM data contained in the IOAM header of a packet.

Examples of multicast related information that a node may include in an IOAM header of a packet include the following.

Replication indication: A flag to indicate that the local node is a replicator (with more than one egress interface);

and/or replication count (i.e. how many copies of the packet a node created; for unicast, the replication count would be 1).

Indicator for whether the traffic is following shared distribution tree.

The RP used for a shared multicast distribution tree.

A flag to indicate whether the node is the RP for the group.

Indicator for whether the traffic is following the shortest tree (multicast group lookup)

Reverse-Path Forwarding (RPF) information (RPF interface, RPF check true/false)

In IP multicast routing, the router forwards the packet away from the source to make progress along the distribution tree and prevent routing loops. The router's multicast forwarding state runs more logically by organizing tables based on the reverse path, from the receiver back to the root of the distribution tree. This process is known as RPF. RPF checks are also a very useful tool for unicast traffic. For example, failed RFP checks on unicast traffic often point to spoofed/malicious traffic.

This additional packet replication information about the node can be collected in IOAM trace data. The new data can be defined as a new trace type and/or extensions to the current trace data. It could also be carried as opaque data in case the multicast specific fields would not be defined/standardized as part of the main trace option data.

Again, a new data type and format is defined for packet replication information. The data type will help the operator to carry not only the traditional path information (ingress/egress interface, node-id etc.), but also the details that are specific to multicast data or, as described below in connection with FIG. 6, packet replication information indicating a packet has been replicated to be processed by a receive-only service function in a service function chain. Capturing the data at any egress node will allow a network administrator to understand the exact path and the replication nodes along the path from the source.

Figure 2:
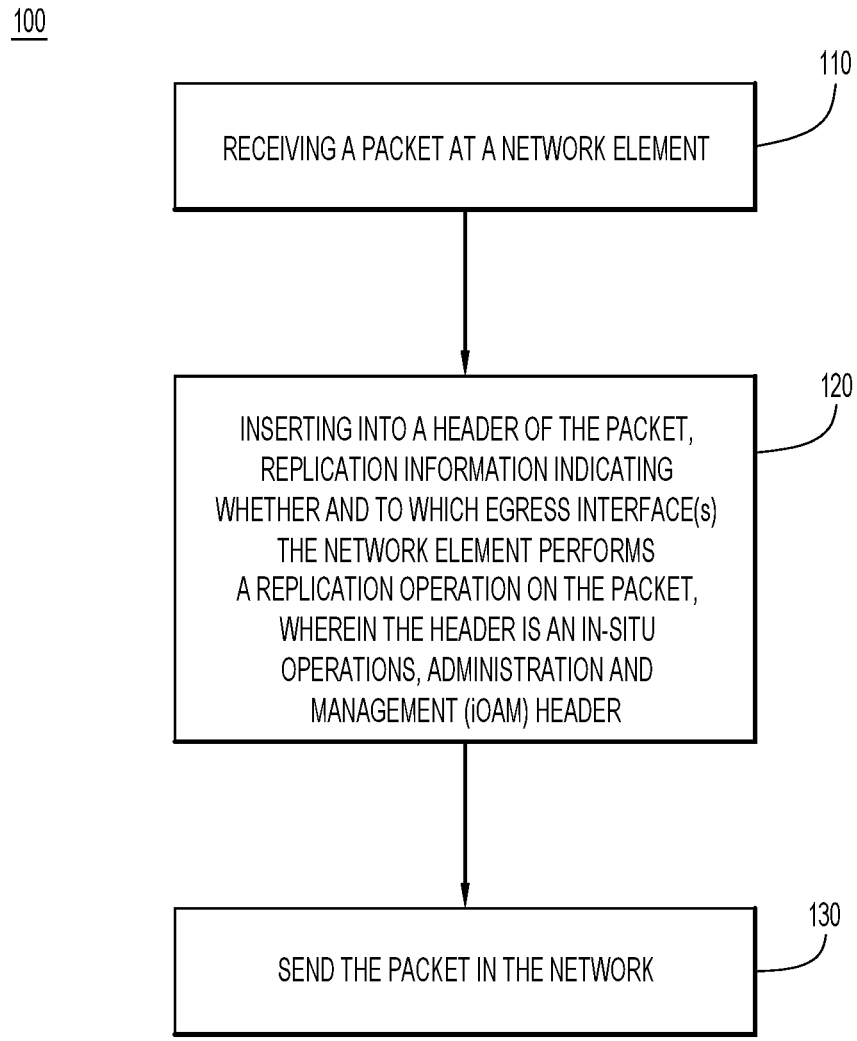
FIG. 2 is a high-level flowchart of a method performed by a network element according to example embodiments.

Reference is now made to FIG. 2. FIG. 2 illustrates a high-level flow chart of a method 100 including operations performed by a network element according to the embodiments presented herein. FIGS. 3-6 illustrate examples of specific use cases and implementations of these embodiments.

At 110, a network element receives a packet. The network element may receive the packet from a source (such as server host) or from another network element in a network. At 120, the network element inserts into a header of the packet, packet replication information indicating whether and to which egress interface(s) the network element performs a replication operation on the packet. The header is an IOAM header. At 130, the network element sends the packet, with the packet replication information included in the IOAM header, in the network.

As explained above in connection with FIG. 1, the information from the IOAM header of packets may be collected from one or more network elements in the network that encapsulate the packet to obtain the packet replication information. A network controller may analyze the packet replication information to generate, if necessary, one or more controls that alter a configuration of one or more network elements in the network to improve performance of the network.

The inclusion of packet replication information in an IOAM header of packets is applicable in a variety of scenarios, including but not limited to:

Overlay Multicast encapsulation (Multicast Virtual Private Networking (MVPN), Ethernet Virtual Private Networking-Broadcast, Unknown unicast and Multicast (EVPN-BUM), Overlay Transport Virtualization (OTV), etc.)

IPv6 Multicast

IPv6 BIER

Multi-Protocol Label Switching-BIER (MPLS-BIER)

Optimization Example Use Case

Figure 3:
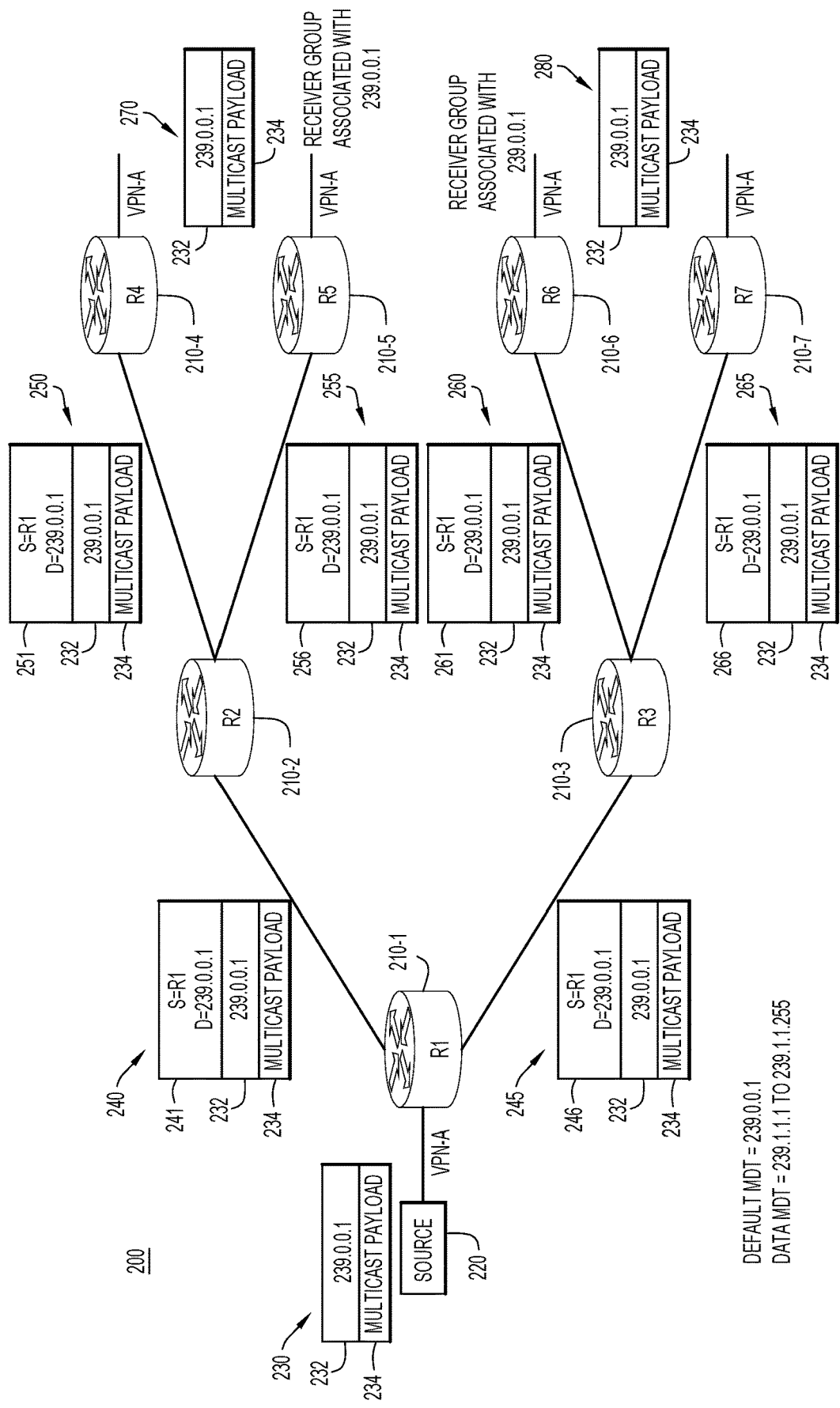
FIGS. 3 and 4 are diagrams of a network in which a network element may insert multicast related information in an IOAM header to announce availability of a multicast group, according to an example embodiment.
Figure 4:
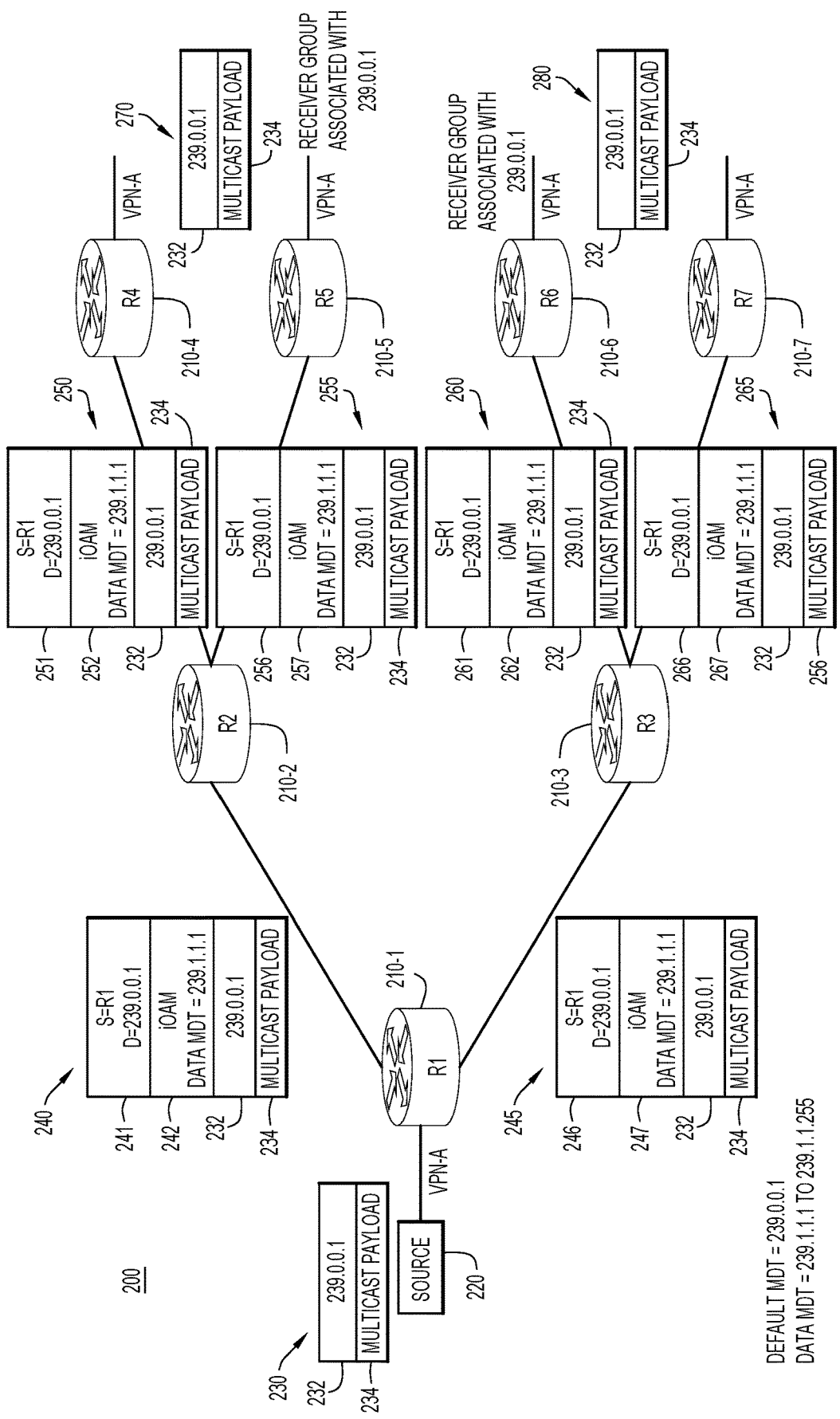

The following terminology is defined for purposes of the description of FIGS. 3 and 4.

Data Multicast Distribution Tree (Data MDT)—A multicast tree created dynamically by the existence of active sources in a network sending to active receivers located behind separate routers. A Data MDT will only connect to routers that are either attached to routers with active sources or receivers of traffic from active sources or that are directly attached to active sources or receivers of traffic.

Default MDT—A multicast tree created by the MVPN configuration. The Default-MDT is useful for a customer Control Plane and low rate Data Plane traffic. It connects all of the routers with MVRFs in a particular Multicast Domain (MD) and one will exist in every MD whether there is any active source in the respective customer network.

In overlay multicast scenarios like MVPN or EVPN, it is desirable to carry additional data from ingress to egress nodes. While one example is to perform performance measurement (like sequencing the packet or jitter/delay measurement), In-Situ OAM can also be used to convey messages between ingress/egress nodes. For example, in MVPN scenarios, an ingress node can use In-Situ OAM to carry relevant details that can be used to switch from a Default MDT (Selective Provider Multicast Service Interface (S-PMSI) tunnel) to a Data MDT (Inclusive Provide Multicast Service Interface (I-PMSI) tunnel).

Turning to FIGS. 3 and 4, a use case example is now described in which the techniques described above in connection with FIGS. 1 and 2 can be applied to in-band announcing of multicast group availability. In FIGS. 3 and 4, the example network scenario uses Multicast Virtual Private Network (MVPN) techniques, where the Ingress/Provider Edge (PE) node (R1 in this example) encapsulates the multicast packet with an outer multicast header. Thus, R1 is the source (S) in the packet examples shown in FIGS. 3 and 4. For simplicity, the network controller 35 and the collector 37 shown in FIG. 1 are not shown in FIGS. 3 and 4, but it is to be understood that these elements would be present in an actual system deployment. FIG. 3 shows a network 200 that includes routers R1-R7 at 210-1 through 210-7, respectively. A source 220 is connected to R1.

A Default MDT tree (or PMSI tunnel) used for Customer VPN-A uses multicast group address 239.0.0.1 and is uniquely identified by that address. There are receivers for multicast group address 239.0.0.1 only in Site 2 and 3, corresponding to the locations of routers R5 and R6. Using 239.0.0.1 as MDT will result in forwarding the traffic to all provider edge (PE) routers connected to VPN-A, which will include routers R4-R7. The packet sent from the source 220 to ingress PE router R1 is shown at 230. Packet 230 includes a multicast header 232 (including the multicast group address 239.0.0.1) and multicast payload 234. R1 multicasts the packet 230 to R2 and R3 by way of packets 240 and 245, respectively. Packet 240 includes a transport header 242, multicast header 232 and multicast payload 234. Similarly, packet 245 includes a transport header 246, multicast header 232 and multicast payload 234.

R2 receives packet 240 and in turn multicasts it to R4 and R5 by way of packets 250 and 255, respectively. Packet 250 includes a transport header 251, multicast header 232 and multicast payload 234. Likewise, packet 255 includes a transport header 256, multicast header 232 and multicast payload 234.

Similarly, R3 receives packet 245 and in turn multicasts it to R6 and R7 by way of packets 260 and 265. Packet 260 includes a transport header 261, multicast header 232 and multicast payload 234. Likewise, packet 265 includes a transport header 266, multicast header 232 and multicast payload 234.

R5 forwards a packet 270 with the multicast header 232 and multicast payload 234 to a receiver group associated with the multicast group address 239.0.0.1 and R6 forwards a packet 280 with the multicast header 232 and multicast payload 234 to a receiver group associated with the multicast group address 239.0.0.1.

In order to have a Data MDT initiated (239.1.1.1 to 239.1.1.255), without using the IOAM techniques described above, ingress PE router R1 would have to send the control plane details, via the Border Gateway Protocol (BGP) for example, to have the relevant routers (with receivers for 239.0.0.1 to build the Data MDT tree.

With the use of IOAM, the control plane messaging can be eliminated and the IOAM headers can carry the relevant Data MDT details that can be used by the relevant routers to build the MDT tree. This is shown in FIG. 4. R1 will include in IOAM header 242 of packet 240 the new Data MDT details and forward the traffic over the Default MDT (239.0.0.1). R1 will include the same information in IOAM header 247 of packet 245.

R2 will include the new Data MDT details in IOAM header 252 of packet 250 in IOAM header 257 of packet 255. Similarly, R3 will include the new Data MDT details in IOAM header 262 of packet 260 and in IOAM header 267 of packet 265.

Any receiver will use the multicast information included in the IOAM header information to join the new Data MDT, avoiding the need for using an out-of-band control mechanism. R1 does not need to know whether downstream nodes have receivers for the multicast stream.

Thus, the scenario depicted in FIG. 4 involves in-band announcing of multicast groups that carry data, and announcing that availability so that the endpoints know that the announced multicast groups are available and will be accepting multicast joins. Again, this removes the need for announcing over BGP or flooding to all the routers. A router can announce over the Default MDT group all individual data trees that are available from a particular source, without having to do a recurring flooding and "see who is interested" approach, via BGP or any other out-of-band signaling mechanism, such as a controller-based approach to propagate such information.

Troubleshooting Use Case

Figure 5:
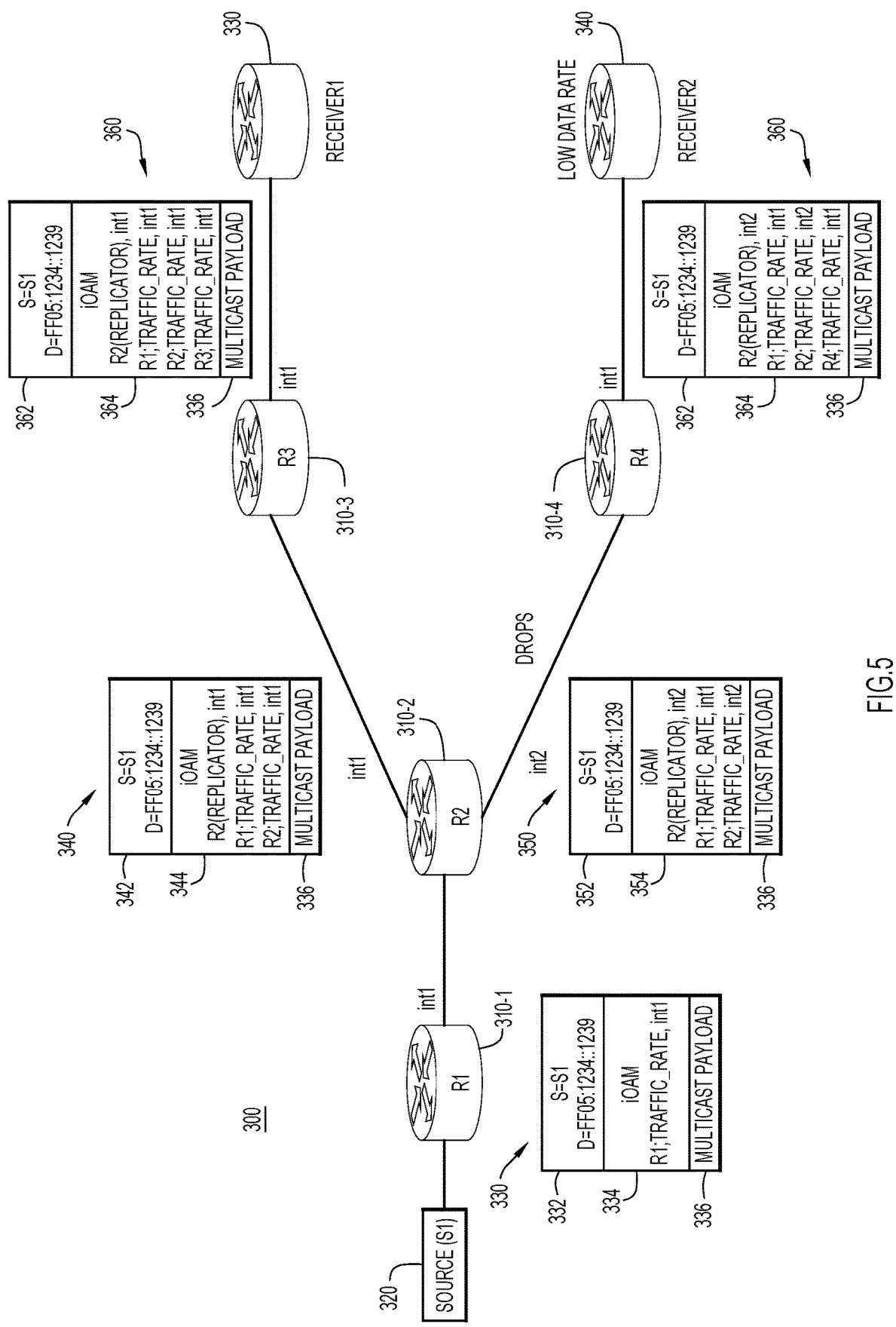
FIG. 5 is a diagram of a network in which a network element is configured to insert into an IOAM header information related to traffic rate or traffic loss experienced by the network element for troubleshooting purposes, according to an example embodiment.

Reference is now made to FIG. 5 for another example use case for using IOAM headers to carry packet replication/multicast related information. Again, for simplicity, the network controller 35 and the collector 37 shown in FIG. 1 are not shown in FIG. 5, but it is to be understood that these elements would be present in an actual system deployment. FIG. 5 shows a network 300 comprised of a Source (S1) and routers R1-R4 at reference numerals 310-1 to 310-4. R2 is a branch node between upstream router R1 and downstream routers R3 and R4. R1 is connected to the source 320. R3 is connected to a first receiver 330, also denoted Receiver 1 and R4 is connected to a second receiver 340, also denoted Receiver 2. In this example, the packets denote S1 as the Source (S) and the destination address (D) is FF05.1:1234::1239.

End receivers may experience choppy video due to a low data rate. For example, as shown in FIG. 5, receiver 340 could be experience a low data rate while receiver 330 is not. This low data rate could be caused by traffic getting dropped somewhere on a linecard or node.

Accordingly, information is included in an IOAM header of a multicast packet to indicate the data rate at which that node is sending data or to indicate a loss or rate drop that the node is experiencing. This could be useful to narrow down which node is the replicator and to identify/locate the link or node that is causing the problem.

The rate at which traffic is being sent by a node for any multicast group is included in the IOAM header of packets. For example, if receiver 1 and 2 are receiving a low data rate. By analyzing the data contained in the IOAM header of packets, it can be determined that R1 is the replicating node. It is further possible to learn the rate at which R1 is sending data and the rate at which R2 is sending data to locate the cause of the problem.

More specifically, R1 receives a traffic stream from the source 320. An example of a packet that R1 sends to R2 is shown at 330. The packet includes 330 includes a transport header 332 (with source and destination information), IOAM header 334 and multicast payload 336. In one example, R1 inserts into the IOAM header 334 the traffic date rate that R1 sends traffic to R2. This is denoted as "R1; traffic_rate" in header 334. R2 is a replicator for the multicast payload and replicates traffic to R3 and R4. For example, in packet 340 that R2 sends to R3, there is a transport header 342, IOAM header 344 and multicast payload 336. R2 inserts into IOAM header 344 an indicator that it is a replicator to egress interface int1 ("R2(replicator), int1") and also the rate that R2 sends traffic to R3, denoted "R2;traffic_rate". Thus, IOAM header 344 of packet 340 includes "R1; traffic_rate, int1" indicating the traffic rate that R1 sends on egress interface "int1" to R2 for this multicast group and "R2; traffic_rate, int1" indicating the traffic rate that R2 sends on egress interface "int1" to R3 for this multicast group. Similarly, R2 sends a packet 350 on egress interface "int2" to R4. Packet 350 includes a transport header 352, IOAM header 354 and multicast payload 336. The IOAM header 354 of packet 350 includes, in addition to an indicator that R2 is a replicator to egress interface int2 ("R2(replicator), int2"), the traffic rate that R1 sends on egress interface int1 to R2 ("R1; traffic_rate, int1") and the traffic rate that R2 sends on egress interface int2 to R4 ("R2; traffic_rate, int2").

Further still, R3 sends data to receiver 330 and a given packet of that stream is shown at 360. Packet 360 includes a transport header 362, IOAM header 364 and multicast payload 336. R3 inserts into the IOAM header 364 the rate at which it sends on egress interface "int1" data to receiver 330, denoted "R3;traffic_rate, int1". Thus, IOAM header 364 includes three data rates: R1;traffic_rate, int1, R2;traffic_rate, int1 and R3;traffic_rate, int1. Similarly, R4 sends on egress interface "int1" data to receiver 340 and a given packet of that stream is shown at 370. IOAM header 364 also includes data indicating that R2 is a replicator ("R2(replicator)") because R2 inserted that into the packet 340. Packet 370 includes a transport header 372, IOAM header 374 and multicast payload 336. R3 inserts into the IOAM header 374 the rate at which it sends data to receiver 340, denoted "R4;traffic_rate, int1". Thus, IOAM header 374 includes three data rates: R1;traffic_rate, in1, R2;traffic_rate, int2, and R4;traffic_rate, int1. IOAM header 374 also includes data indicating that R2 is a replicator ("R2(replicator)") because R2 inserted that into the packet 350.

As one example, R2 is sending traffic to R3 at 24 Mbps, and therefore R2 inserts into IOAM header 344 for R2;traffic_rate (24 Mbps) and R3 is receiving traffic from R2 at 15 Mbps. Consequently, there is obviously a problem between R2 and R3. To remedy this, one of the other Equal Cost Multi-Path (ECMP) paths can be used to build a tree and send a prune to R2. Similarly, receiver 340 is receiving data from R4 at a low data rate R4. Based on the rate information included in the IOAM header 364 of packet 370, it may be determined that there are packets being dropped between R2 and R4 because the rate information indicates that receiver 340 is receiving data at the same rate that R4 is sending data to receiver 340, but R4 is receiving data at a lower data rate than the rate that R2 is sending data to R4.

The inclusion of specific data rates in an IOAM header of multicast packets may be generalized. Instead of including absolute data rate information in an IOAM header, a node may insert loss rate indication (e.g., loss percentage) information in an IOAM header on a per link basis. A node may need to drop a portion of the traffic it receives from an upstream node because it cannot cope with a higher rate. For example, R1 to R2 see 0% packet loss, but R2 to R4 had 15% packet loss and between R4 and receiver 340 there is 0% packet loss. Thus, using this packet loss information, it is possible to narrow down the cause of the problem.

As described above in connection with FIG. 1, information may be included in the IOAM header as to which other (additional) egress interface(s) that data/packet was replicated. For example, the IOAM header 344 of packet 53400 may further include "[R2(replicator), int2]" to indicate in packet 340 (to all entities that receive packet 340) that R2 also replicated that data/packet to egress interface int2 of R2. Similarly, the IOAM header 354 of packet 350 may further include "[R2(replicator), int1]" to indicate in packet 350 (to all entities that receive packet 60) that R2 also replicated that data/packet to egress interface int1 of R2.

Receive-Only Service Function Proof-of-Transit

A category of services used in a Service Function Chain (SFC) framework, such as an Intrusion Detection Service and a Packet Capture Service, operates in "receive-only" mode. These types of services are "packet sinks" in that they consume all packets sent to them; they do not forward packets on after performing some function. The concepts described above for multicast scenarios can be generalized, because a multicast leaf is a special form of a "receive-only service function."

When such receive-only services are introduced as part of the SFC there is no end-to-end visibility of packets flowing through the service function chain. The IOAM header can be included in the service header (e.g., SRv6, NSH, GRE) to collect the data from service nodes. According to yet another embodiment, the applicability of In-Situ OAM with service chaining is extended to include telemetry data about receive-only service functions.

Figure 6:
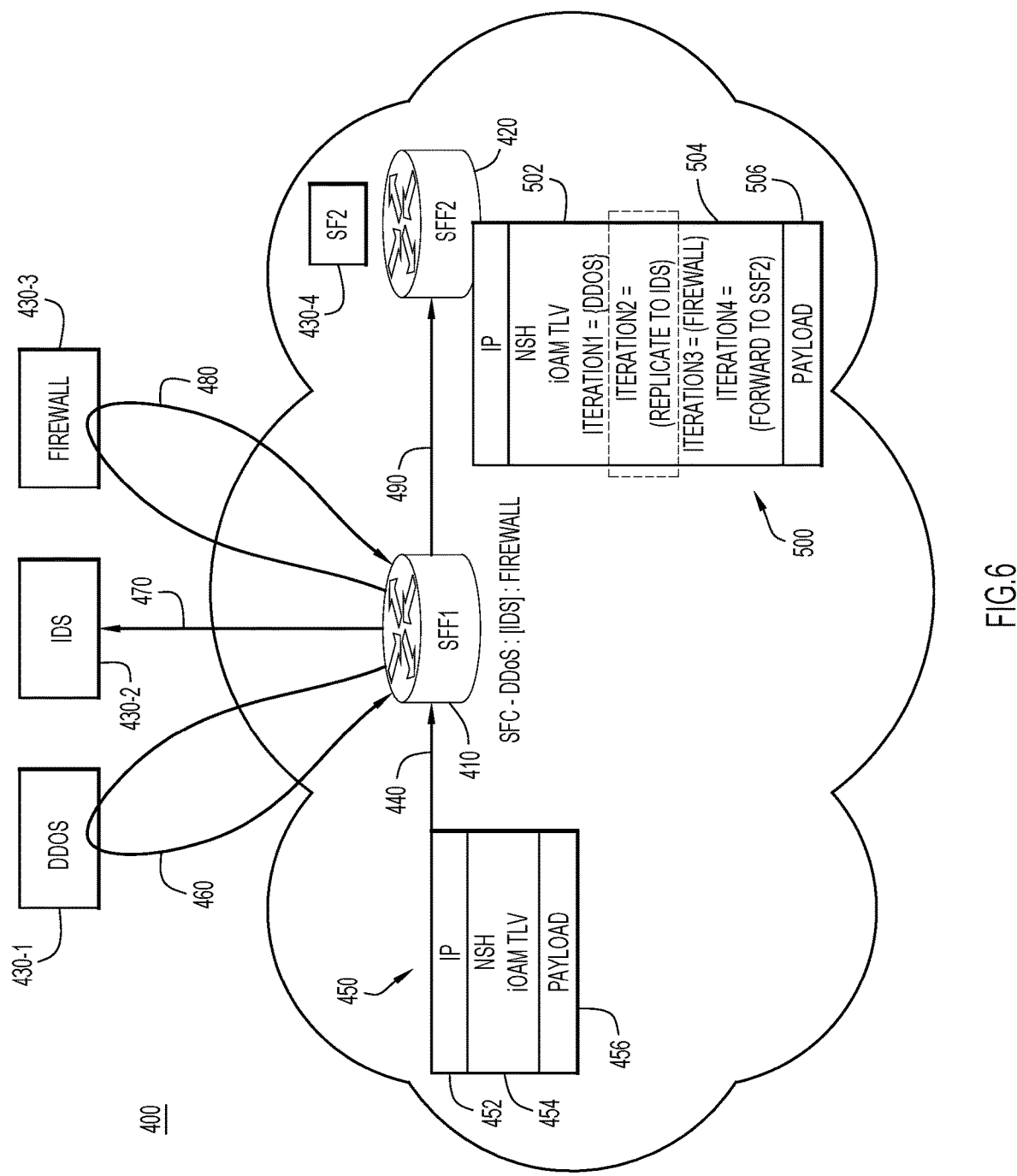
FIG. 6 is a diagram of a network in which a network element is configured to insert into an IOAM header packet replication information to indicate that a copy of a packet is being forwarded to a receive-only service function in a service function chain, according to an example embodiment.

Referring now to FIG. 6, a diagram is shown of a simplified SFC 400 that includes a first node 410 and a second node 420 that are configured to operate as service function forwarders (SFFs). Again, for simplicity, the network controller 35 and the collector 37 shown in FIG. 1 are not shown in FIG. 6, but it is to be understood that these elements would be present in an actual system deployment. The first and second nodes 410 and 420 are also designated as SFF1 and SFF2. SFF1 is connected to a Distributed Denial of Service (DDOA) service function 430-1, an Intrusion Detection Service function 430-2, and a Firewall Service function 430-3. SFF2 is connected to a service function 430-4 identified as SF2. The IDS 430-2 is an example of a receive-only service function.

At 440, SFF1 receives a packet 450 with SFC DDOS-IDS-Firewall. The packet 450 includes a transport header 452, NSH 454 including an IOAM Time-Length-Value and a payload 456. While the IOAM data is shown in FIG. 6 and described herein as being carried as metadata type-2 TLV, it is also envisioned that it may be carried as a next header in accordance with the concepts described in the IETF draft, draft-brockners-sfc-ioam-nsh-.01.

At 460, SFF1 sends the packet towards the DDOS service function 430-1 and the packet is returned from the DDOS service function 430-1.

The next service function in the chain is a receive-only IDS service function 430-2. At 470, SFF1 replicates and sends a copy of the packet to the IDS service function 430-2. SFF1, on replicating the packet at 470, will include the replicated service function details in the original packet. In this example, SFF1 will include the details in the IOAM header of the packet that it forwards on to the next service function, the details indicating that a replicated copy of the packet was sent to IDS 430-2. Packet replication can be indicated, as described above in connection with FIG. 1, by defining and setting a flag in the IOAM trace data that is used to collect the service function details.

Next, at 480, SFF1 forwards that packet to the Firewall service function 430-3 and it returns the packet back to SFF1. At 490, SFF1 forwards the packet 500 to SFF2.

The packet 500 includes a transport header 502, NSH header 504 with IOAM data and a payload 506. The IOAM data includes information about each of the service functions that the packet traversed before departing SFF1. In particular, the IOAM data includes data:
Iteration1=(DDOS)
Iteration2=(replicate to IDS)
Iteration3=(Firewall)
Iteration4=(Forward to SFF2)

Thus, at Iteration2, the packet that returned from the DDOS 430-1 and was sent to IDS 430-2 was replicated and in the original version of that packet that SFF1 forwarded to Firewall 430-3, information is included in the IOAM header to indicate that the packet was replicated and sent to the IDS 430-2. Consequently, even though the IDS is a receive-only service function, the data is included in the IOAM header of the original packet, that gets forwarded on in the SFC, to indicate that a replicated version of that packet was in fact sent to the IDS 430-2. Thus, the IOAM header includes information indicating a proof-of-transit of traffic for the SFC to the IDS 430-2.

IOAM is thereby leveraged to carry in the IOAM trace data information about the receive-only services. This is done by replicating the packet on the SFF and forward one copy to receive-only service function and other to next service function. This can be expanded to certain other use cases. For example, the copy might be sent to a service chain branch that was not intended to be a dead end. This would help troubleshoot such a situation. In addition, the copy of the packet might not have been approved but a device was compromised and it was copied anyhow. This mechanism could help with a security detection of such a situation.

There may be cases involving privacy/legal concerns. If the mechanism is compromised, this might reveal details about operations along the path. Therefore, it may be appropriate in some cases that the lawful intercept detail be masked.

Figure 7:
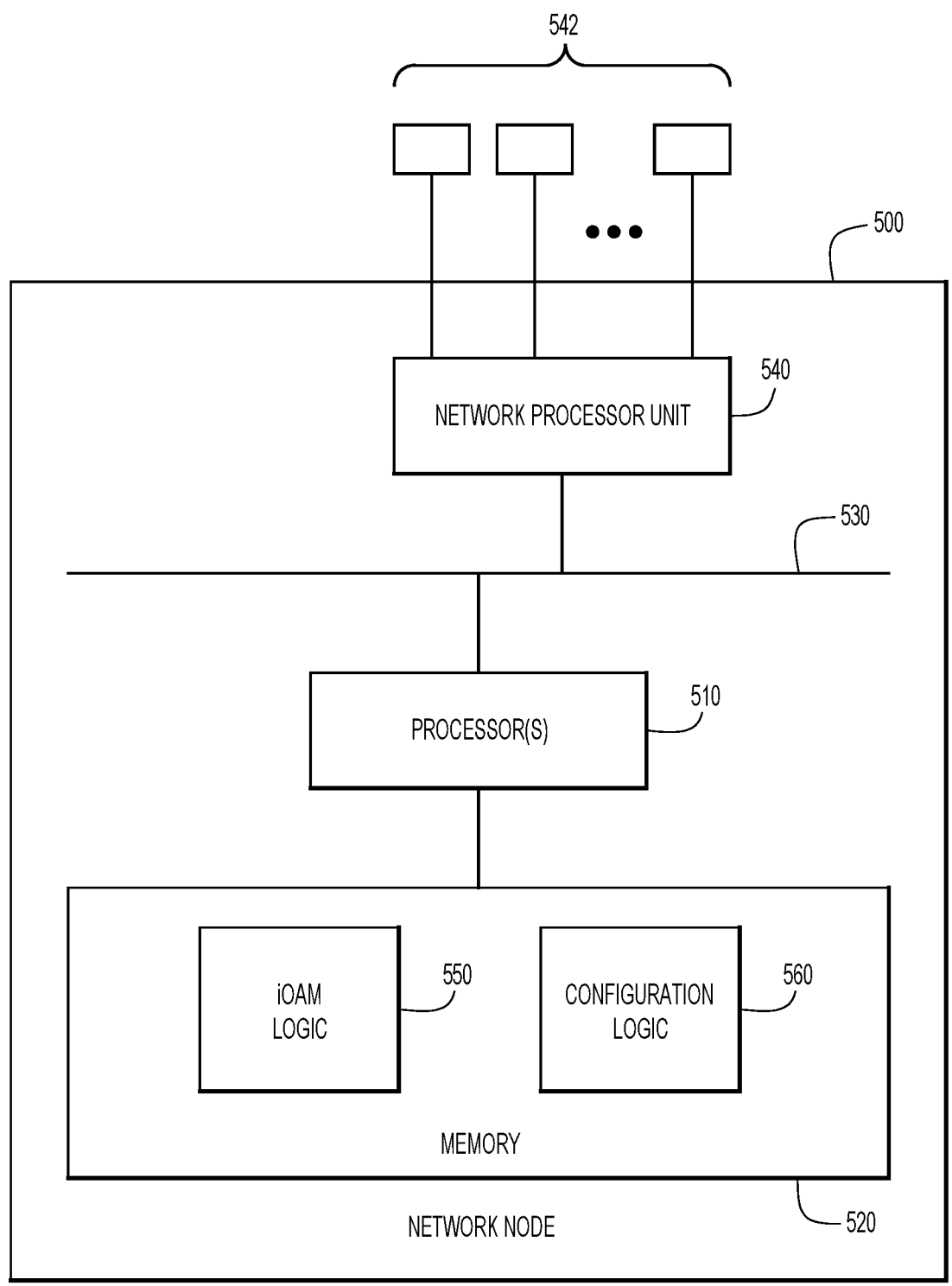
FIG. 7 is a block diagram of a network element configured to perform the operations presented herein, according to an example embodiment.

Reference is now made to FIG. 7. FIG. 7 illustrates a block diagram of a network element (node) 500 configured to perform the operations described in connection with FIGS. 1-6. The network node 500 includes one or more control processors 510, memory 520, a bus 530 and a network processor unit 540. The control processor 510 may be a microprocessor or microcontroller. The network processor unit 540 may include one or more Application Specific Integrated Circuits (ASICs) and facilitates network communications between the node 500 and other network nodes as well as the network controller 35 or collector 37 as shown in FIG. 1. Moreover, the network process unit 540 may be configured to encapsulate a packet to include an IOAM header, and to decapsulate a packet that includes an IOAM header.

There are a plurality of network ports 542 at which the node 500 receives packets and from which the node 500 sends packets into the network. The processor 510 executes instructions associated with software stored in memory 520. Specifically, the memory 520 stores instructions for IOAM logic 550 that, when executed by the processor 510, causes the processor 510 to perform the IOAM insertion operations described herein or to control the network processor unit 540 to perform the IOAM insertion operations described herein. The memory 520 also stores configuration information 560 received from a network controller to configure the network node according to desired network functions. It should be noted that in some embodiments, the IOAM logic 550 may be implemented in the form of firmware that is processed by ASICs as part of the network processor unit 540.

The memory 520 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the network node operations described herein.

Figure 8:
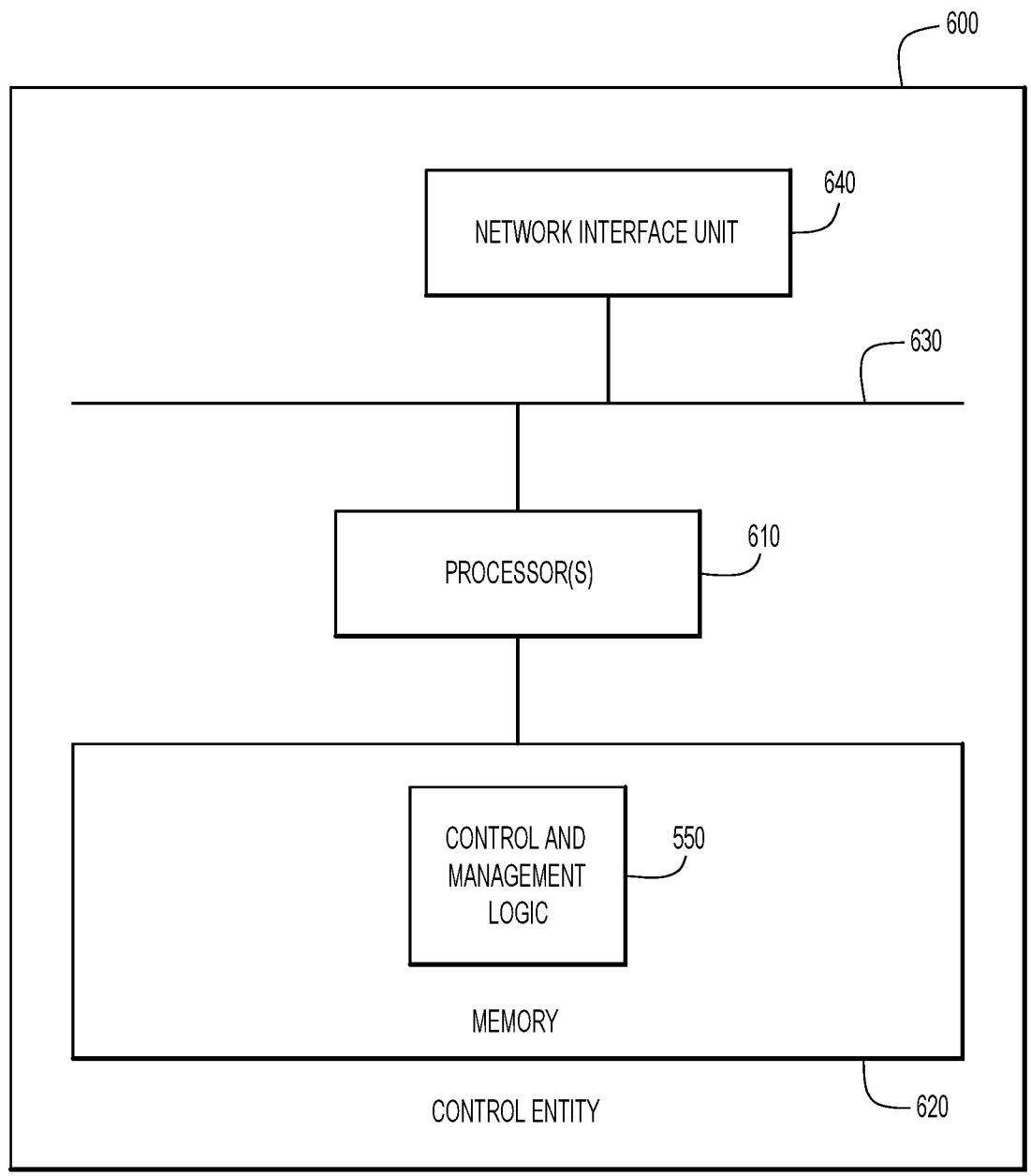
FIG. 8 is a block diagram of a network controller according to an example embodiment.

Reference is now made to FIG. 8. FIG. 8 illustrates a block diagram of a computing/control entity 600 that may perform the functions of the network controller 20 described herein. The computing/control entity 600 includes one or more processors 610, memory 620, a bus 630 and a network interface unit 640, such as one or more network interface cards that enable network connectivity. The memory 620 stores instructions for control and management logic 650, that when executed by the processor 610, cause the processor to perform the network controller operations described herein.

The memory 610 may include ROM of any type now known or hereinafter developed, RAM of any type now known or hereinafter developed, magnetic disk storage media devices, tamper-proof storage, optical storage media devices, flash memory devices, electrical, optical, or other physical/tangible storage devices. In general, the memory 620 may comprise one or more tangible (non-transitory) computer readable storage media (e.g., a memory device) encoded with software comprising computer executable instructions and when the software is executed (by the processor 610) it is operable to perform the network controller operations described herein.

In summary, presented herein are techniques by which a network element for includes in-band in network traffic, packet replication information indicating whether and to which egress interface(s) the network element performs a replication operation on the packet, wherein the header is an In-Situ Operations, Administration and Management (IOAM) header. A network element in a network receives a packet. The network element inserts into a header of the packet replication information indicating whether and to which egress interface(s) of the network element that the network element performs a replication operation on the packet, wherein the header is IOAM header. The network element sends the packet (with the included packet replication information) in the network.

As described above in connection with FIG. 1, in one form, the packet is a multicast packet and the replication operation is part of a multicast operation performed by the network element. In this case, the inserting operation further includes inserting multicast related information that includes attributes of the multicast operation performed by the network element on the packet, and network element forwards multiple copies of the packet to two or more downstream network elements in then network.

In one example, the packet replication information indicates that the network element is a multicast replicator and includes an identifier of each multicast egress interface of the network element to which the network element replicates traffic and an identifier of a multicast egress interface to which the network element sends a copy of the specific packet.

The packet replication information may further indicate a replication count of the packet indicating how many copies the network element creates of the packet. In still another form, the packet replication information indicates that the network element or another network element in the network is a Rendezvous Point (RP) for a multicast shared distribution tree group. In yet another form, the packet replication related information indicates whether the traffic is following a shared distribution tree. The packet replication information may include reverse-path forwarding information including an identifier of the reverse-path forwarding interface and reverse-path forwarding check true/false.

As described above in connection with FIGS. 3 and 4, the multicast related information includes information announcing availability of one or more multicast groups that carry data. For example, the multicast related information is included in a traffic flow of a first multicast group type (e.g., a Default MDT) and announces availability of a second multicast group type (e.g., a Data MDT).

As described above in connection with FIG. 5, the network element may insert traffic rate related information indicating data rate of ingress traffic to, and of egress traffic from, the network element or a packet loss rate experienced by the network element. Moreover, as described in connection with FIG. 6, the packet replication information indicates that the packet is copied by the network element and a copy of the packet is forwarded to a receive-only service function that is part of a service function chain.

The packet replication information may be collected from a network element in the network that decapsulates the packet to obtain the packet replication information from the IOAM header. The collected packet replication information may then be used (e.g., by a network controller) to generate one or more controls that alter a configuration of one or more network elements in the network.

Thus, in another form, an apparatus is provided comprising: a plurality of ports configured to send network traffic into a network and receive network traffic from the network; a processor coupled to the plurality of ports, wherein the processor is configured to: insert into a header of a packet received at one of the plurality of ports, packet replication information indicating whether and to which egress interface(s) the apparatus performs a replication operation on the packet, wherein the header is an In-Situ Operations, Administration and Management (IOAM) header; and cause the packet, with the packet replication information included in the IOAM header, to be sent in the network.

In still another form, one or more non-transitory computer readable storage media are provided encoded with instructions that, when executed by a processor of a network element in a network, cause the processor to: receive a packet; insert into a header of the packet, packet replication information indicating whether and to which egress interface(s) the network element performs a replication operation on the packet, wherein the header is an In-Situ Operations, Administration and Management (IOAM) header; and cause the packet, with the packet replication information included in the IOAM header, to be sent in the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a network element in a network, receiving a packet;
    inserting into a header of the packet, packet replication information indicating whether and to which egress interface(s) the network element performs a replication operation on the packet, wherein the header is an In-Situ Operations, Administration and Management (IOAM) header, and wherein the packet replication information includes traffic rate related information indicating a data rate of ingress traffic to, and of egress traffic from, the network element; and
    sending the packet, with the packet replication information included in the IOAM header, in the network.

2. The method of claim 1, wherein the packet is a multicast packet and the replication operation is part of a multicast operation performed by the network element, and wherein inserting further includes inserting multicast related information that includes attributes of the multicast operation performed by the network element on the packet, and wherein forwarding includes forwarding multiple copies of the packet to two or more downstream network elements in the network.

3. The method of claim 2, wherein the multicast related information includes information announcing availability of one or more multicast groups that carry data.

4. The method of claim 3, wherein the multicast related information is included in a traffic flow of a first multicast group type and announces availability of a second multicast group type.

5. The method of claim 1, wherein the packet replication information indicates that the network element is a multicast replicator and includes an identifier of each multicast egress interface of the network element to which the network element replicates traffic and an identifier of a multicast egress interface to which the network element sends a copy of the packet.

6. The method of claim 1, wherein the packet replication information indicates that the network element or another network element in the network is a Rendezvous Point (RP) for a multicast shared distribution tree group.

7. The method of claim 1, wherein the packet replication information includes reverse-path forwarding information including an identifier of a reverse-path forwarding interface and a reverse-path forwarding check.

8. The method of claim 1, wherein inserting includes inserting traffic rate related information indicating a packet loss rate experienced by the network element.

9. The method of claim 1, wherein the packet replication information indicates that the packet is copied by the network element and a copy of the packet is forwarded to a receive-only service function that is part of a service function chain.

10. The method of claim 1, further comprising:
    collecting the packet replication information from a network element in the network that decapsulates the packet to obtain the packet replication information from the IOAM header; and
    analyzing the packet replication information to generate one or more controls that alter a configuration of one or more network elements in the network.

11. The method of claim 1, wherein the packet replication information further indicates a replication count of the packet indicating how many copies the network element creates of the packet.

12. An apparatus comprising:
    a plurality of ports configured to send and receive network traffic into and from a network;
    a processor coupled to the plurality of ports, wherein the processor is configured to:
        insert into a header of a packet received at one of the plurality of ports, packet replication information indicating whether and to which egress interface(s) the apparatus performs a replication operation on the packet, wherein the header is an In-Situ Operations, Administration and Management (IOAM) header, and wherein the packet replication information includes traffic rate related information indicating a data rate of ingress traffic to, and of egress traffic from, the apparatus; and
        cause the packet, with the packet replication information included in the IOAM header, to be sent in the network.

13. The apparatus of claim 12, wherein the packet is a multicast packet and the replication operation is part of a multicast operation performed by the apparatus, and wherein the processor is further configured to insert multicast related information that includes attributes of the multicast operation performed by the apparatus on the packet, and to cause multiple copies of the packet to be sent two or more downstream network elements in the network.

14. The apparatus of claim 13, wherein the multicast related information includes information announcing availability of one or more multicast groups that carry data, and the multicast related information is included in a traffic flow of a first multicast group type and announces availability of a second multicast group type.

15. The apparatus of claim 12, wherein the packet replication information indicates that the apparatus is a multicast replicator and includes an identifier of each egress interface of the apparatus to which the apparatus replicates traffic and an identifier of a multicast egress interface to which the apparatus sends a copy of the packet.

16. The apparatus of claim 12, wherein the processor is configured to insert traffic rate related information indicating a packet loss rate experienced by the apparatus.

17. One or more non-transitory computer readable storage media encoded with instructions that, when executed by a processor of a network element in a network, cause the processor to:
    receive a packet;
    insert into a header of the packet, packet replication information indicating whether and to which egress interface(s) the network element performs a replication operation on the packet, wherein the header is an In-Situ Operations, Administration and Management (IOAM) header, and wherein the packet replication information includes traffic rate related information indicating a data rate of ingress traffic to, and of egress traffic from, the network element; and
    cause the packet, with the packet replication information included in the IOAM header, to be sent in the network.

18. The one or more non-transitory computer readable storage media of claim 17, wherein the packet is a multicast packet and the replication operation is part of a multicast operation performed by the network element, and wherein the instructions cause the processor to insert multicast related information that includes attributes of the multicast operation performed by the network element on the packet, and to cause multiple copies of the packet to be sent two or more downstream network elements in the network.

19. The one or more non-transitory computer readable storage media of claim 18, wherein the multicast related information includes information announcing availability of one or more multicast groups that carry data, and the multicast related information is included in a traffic flow of a first multicast group type and announces availability of a second multicast group type.

20. The one or more non-transitory computer readable storage media of claim 17, wherein the packet replication information indicates that the network element is a multicast replicator and includes an identifier of each multicast egress interface of the network element to which the network element replicates traffic and an identifier of a multicast egress interface to which the network element sends a copy of the packet.

* * * * *